US009336432B2

(12) United States Patent
Jain et al.

(10) Patent No.: US 9,336,432 B2
(45) Date of Patent: May 10, 2016

(54) ADAPTATION OF A VECTOR DRAWING BASED ON A MODIFIED PERSPECTIVE

(71) Applicant: Adobe Systems Incorporated, San Jose, CA (US)

(72) Inventors: Gaurav Jain, Utter Pradesh (IN); Ankur Gupta, Utter Pradesh (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 131 days.

(21) Appl. No.: 14/296,550

(22) Filed: Jun. 5, 2014

(65) Prior Publication Data

US 2015/0356343 A1    Dec. 10, 2015

(51) Int. Cl.
| | |
|---|---|
| G06T 15/00 | (2011.01) |
| G06K 9/00 | (2006.01) |
| G06T 11/40 | (2006.01) |
| G06T 11/20 | (2006.01) |
| G06T 15/20 | (2011.01) |

(52) U.S. Cl.
CPC .......... *G06K 9/00208* (2013.01); *G06T 11/203* (2013.01); *G06T 11/40* (2013.01); *G06T 15/20* (2013.01); *G06T 2207/10004* (2013.01)

(58) Field of Classification Search
CPC ......... G06T 19/00; G06T 17/20; G06T 17/00; G06T 15/10; G06T 15/00
USPC ........................................................ 345/419
See application file for complete search history.

(56) References Cited

U.S. PATENT DOCUMENTS

| | | | | |
|---|---|---|---|---|
| 4,835,532 A | * | 5/1989 | Fant ....................... | G09B 9/301 340/980 |
| 6,771,276 B1 | * | 8/2004 | Highsmith ............. | G06T 15/20 345/419 |
| 8,416,237 B1 | | 4/2013 | Jain | |
| 2008/0018668 A1 | * | 1/2008 | Yamauchi ............... | G06T 17/00 345/633 |

* cited by examiner

*Primary Examiner* — Ke Xiao
*Assistant Examiner* — Gordon Liu
(74) *Attorney, Agent, or Firm* — Finch & Maloney PLLC

(57) ABSTRACT

Techniques for modifying the appearance of objects comprising a two-dimensional vector drawing are disclosed. Such modifications can be made in response to user input that manipulates a viewing perspective for the drawing. Before a user manipulates the viewing perspective for given scene, information relating to the objects comprising the scene is stored in a data structure. Such information may include, for each object in the scene, a two-dimensional projection of the object onto a reference plane and parameters characterizing the reference plane. Once the user has finished defining the modified viewing perspective, the objects are projected from the reference plane to the modified perspective. The parameters characterizing the reference plane are applied to ensure that the object is rendered at the correct orientation and depth in the modified perspective. Objects comprising the scene can thus be automatically updated in response to the user's manipulation of the viewing perspective.

19 Claims, 7 Drawing Sheets

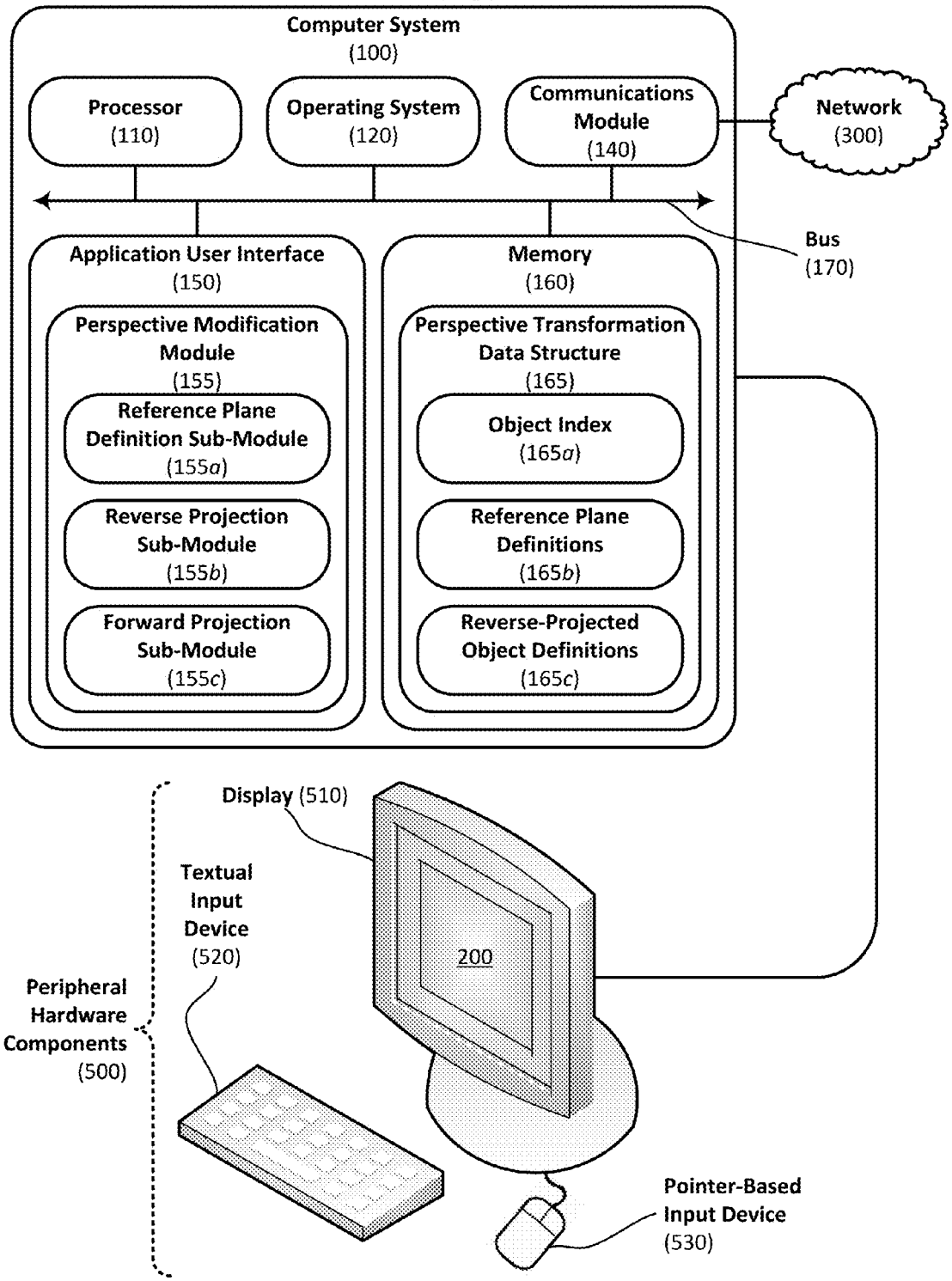

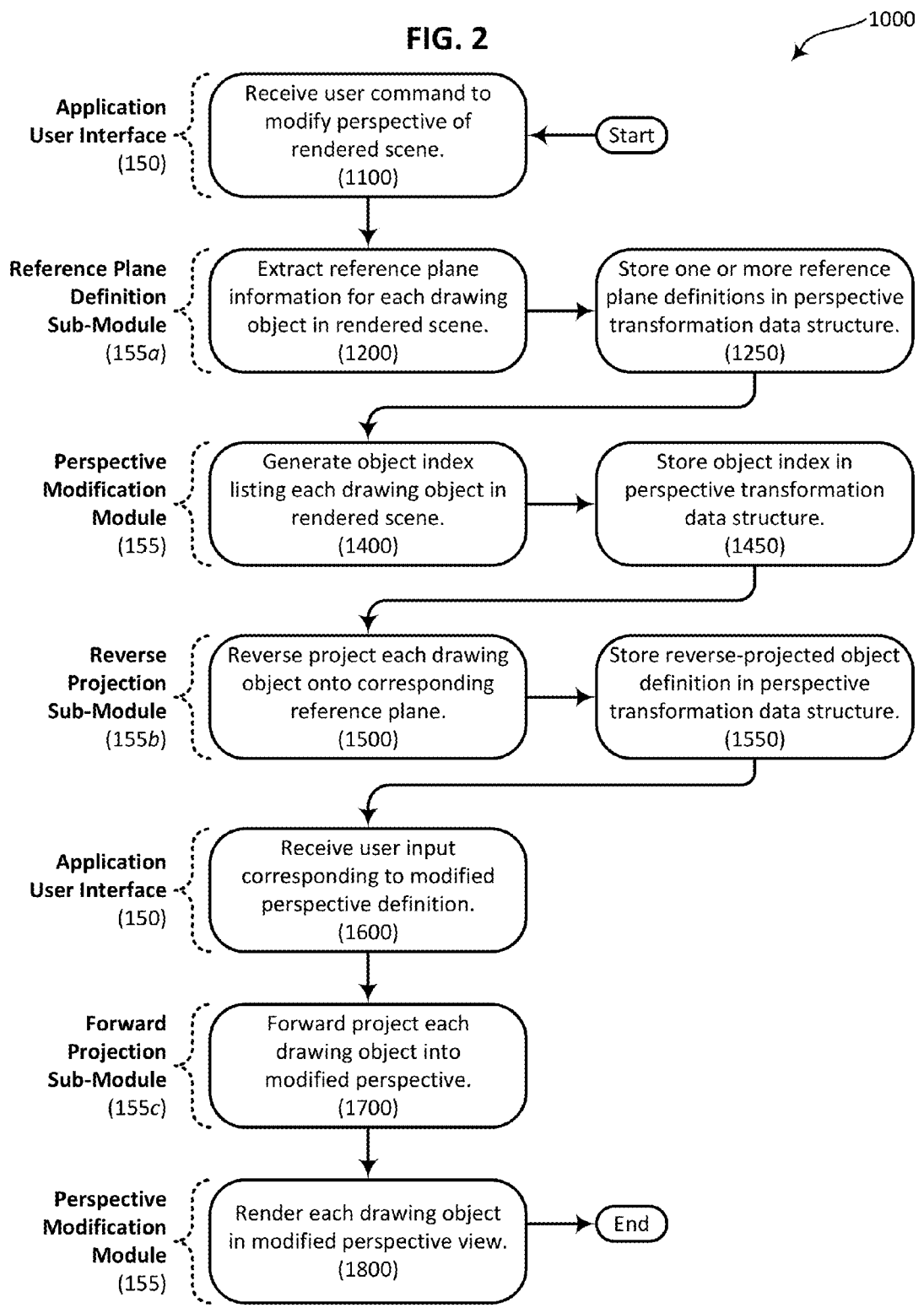

ADAPTATION OF A VECTOR DRAWING BASED ON A MODIFIED PERSPECTIVE

FIELD OF THE DISCLOSURE

This disclosure relates generally to the field of computer graphics, and more specifically, to computationally efficient techniques for updating the appearance of a two-dimensional vector drawing based on changes to a perspective that is used to view the drawing.

BACKGROUND

It is often desired to display a three-dimensional scene as an image in a two-dimensional space, such as on a display screen or on a printed piece of paper. One way of mapping a three-dimensional scene onto a two-dimensional planar surface is by using a graphical projection technique that allows the scene to be viewed as it appears from a given perspective. This perspective can be defined in terms of a viewpoint located at a given distance and angle from the scene being viewed. A perspective view of a three-dimensional scene therefore varies depending on the particular viewpoint that forms the basis for the view. In general, two-dimensional perspective views of a given three-dimensional scene share certain common characteristics. For example, parallel lines of objects appearing in the scene, such as the tops and bottoms of a building, or the edges of a roadway, will be directed towards one or more common vanishing points. In addition, because objects rendered in perspective are scaled relative to the viewpoint defining the perspective, an object will appear to become smaller as it is positioned further from the viewpoint. An object rendered in perspective will also appear foreshortened, such that the object's dimensions along the line of sight appear relatively shorter than dimensions across the line of sight. This causes, for example, a circle or a square in a three-dimensional scene to appear as an ellipse or a trapezoid, respectively, in a perspective view of that scene. Thus, unlike three-dimensional modeling techniques, perspective drawing provides a representation of a three-dimensional scene using two-dimensional drawing techniques to provide a realistic view that approximates how the scene appears to the human eye. Certain commercially available graphics editing software applications provide users with the ability to generate vector drawings in a perspective view. Examples of such software applications include Adobe Illustrator (Adobe Systems Incorporated, San Jose, Calif.) and CorelDRAW (Corel Corporation, Ottawa, Canada).

BRIEF DESCRIPTION OF THE DRAWINGS

FIG. 1 is a block diagram schematically illustrating selected components of a computer system that can be used to implement certain of the embodiments disclosed herein.

FIG. 2 is a flowchart illustrating an example image manipulation method for updating the appearance of a two-dimensional vector drawing based on changes to a perspective that is used to view the drawing in accordance with certain of the embodiments disclosed herein.

DETAILED DESCRIPTION

Figure 3A:
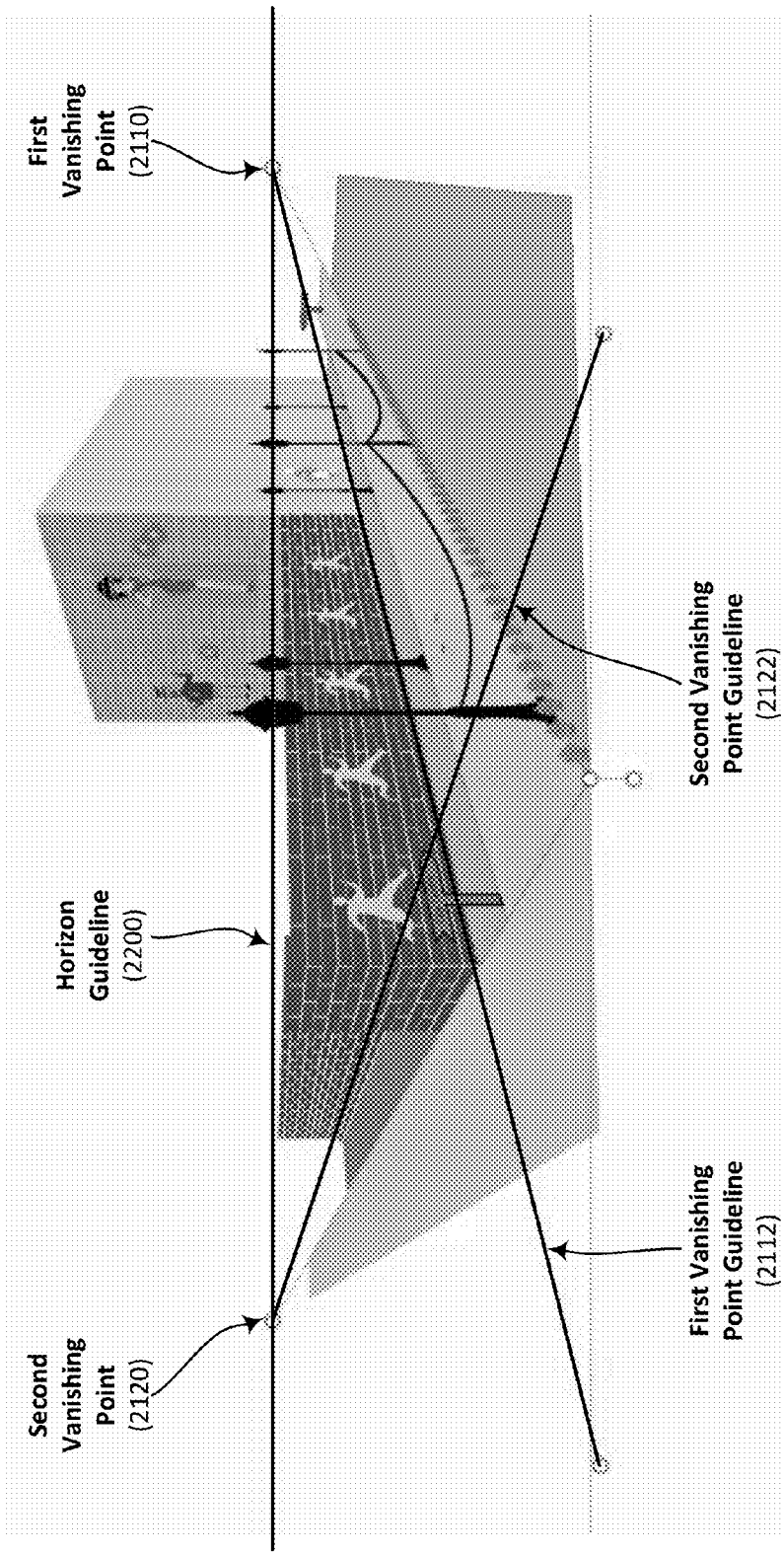
FIG. 3A is a two-dimensional perspective view of a three-dimensional scene rendered in accordance with an initial perspective.

Existing graphics editing software applications allow a user to generate two-dimensional vector drawings in perspective. In particular, such applications allow a user to define a perspective based on scene parameters such as number of vanishing points, viewing distance, horizon height, and viewing angle. The user can then generate new objects in the user-defined perspective. However, if the user wishes to modify the perspective, for example, to see how the objects in a given scene appear from a different perspective, existing applications require the user to individually redefine each of the objects in the modified perspective. This is particularly problematic in the case of a scene containing a large number of objects since making even a small adjustment to the viewing perspective could require tens, hundreds, thousands, or more objects to be manually regenerated. Manipulating objects individually also makes it difficult to ensure that the regenerated objects uniformly conform to the modified perspective. While some graphics editing software applications allow basic perspective transformations to be performed on individual objects, existing systems cannot uniformly transform an entire scene in response to user input that modifies an overarching viewing perspective.

Thus, and in accordance with certain of the embodiments of the present invention, techniques are disclosed that provide computationally efficient and automated techniques for uniformly modifying the appearance of objects comprising a two-dimensional vector drawing. Such modifications can be made in response to user input that manipulates a viewing perspective for the drawing. In particular, before a user manipulates the viewing perspective for given scene, information relating to the various objects comprising the scene is stored in a data structure, in accordance with an embodiment. Such information may include, for each object in the scene, a two-dimensional projection of the object onto a reference plane and parameters characterizing the reference plane onto which the object is projected. Once the user has finished defining the modified viewing perspective, the objects are projected from the reference plane to the modified perspective. The parameters characterizing the reference plane are applied to ensure that the object is rendered at the correct orientation and depth in the modified perspective. Objects comprising the scene can thus be automatically updated in response to the user's manipulation of the viewing perspective, thereby eliminating or otherwise substantially reducing any need for the user to manually redefine each of the objects in the new perspective. In addition, automatically updating objects to conform to the modified perspective helps to ensure that all objects within the scene are uniformly rendered according to the same modified viewing perspective. Such embodiments can be implemented, for example, as a module that forms part of a graphics editing software application that is capable of rendering objects according to a user-defined perspective. Numerous configurations and variations will be apparent in light of this disclosure, including implementations in a standalone desktop application, a mobile application specifically configured for use with a portable computing device, and a subscription-based application service.

For example, a user such as a graphic artist or other computer user is working with a two-dimensional vector drawing that represents a three-dimensional scene. The vector drawing, which is rendered in an initial perspective, may comprise tens, hundreds, thousands, or more individual drawing objects that form the scene. Examples of such drawing objects include lines, polygons, conic sections, Bézier curves, composite object groups, and other drawing objects. The user wishes to change the perspective used to view the scene from the initial perspective to a modified perspective. In response to a user command to modify the initial perspective, a software module configured in accordance with an embodiment is programmed to generate a data structure. This data structure includes an index of the objects which comprise the vector drawing. The software module is further programmed to reverse-project each indexed object onto a reference plane as a flat, two-dimensional object. Data characterizing the reverse-projected image is stored in the data structure, for example, in terms of points or vector drawing objects that are rendered in the corresponding reference plane. Data characterizing the reference plane onto which the object is currently projected is also stored in the data structure. For example, the reference plane can be defined in terms of an orientation as well as a depth or height from the viewer or the ground, respectively.

The aforementioned data structure can be generated in a manner that is transparent to the user. In particular, from the user's perspective the software responds to the command to modify the initial perspective by invoking any suitable user interface technique for receiving a modified perspective definition. Examples of such user interface techniques include dragging guidelines corresponding to a viewing plane for the perspective, adjusting anchor points corresponding to vanishing points in the perspective, or manually entering values for parameters such as a viewing distance or angle for a viewpoint. Because the aforementioned data structure is derived from drawing objects defined in the initial perspective, and because the foregoing user interface techniques do not actually modify existing drawing objects, the data structure can be generated before, during, or after the user's definition of the modified perspective. When the user is finished defining the modified perspective, and when the data structure includes all drawing objects which are to be rendered in the modified perspective, each object in the data structure is forward-projected from its corresponding reference plane to the modified perspective. The depth or height parameter is used to ensure that the forward-projected object is rendered at the correct location in the modified perspective. Thus the forward-projected object will be positioned over or under other forward-projected drawing objects as appropriate. Rendering all of the forward-projected objects in the modified perspective will result in a uniform transformation of the drawing objects from the initial perspective to the user-defined modified perspective. Configuring the software module to perform such transformation in response to the user's command to modify the perspective provides an automated system that transforms all drawing objects without any additional user input beyond that which is used to define the modified perspective itself.

As used herein, the term "perspective" refers, in addition to its ordinary meaning, to a protocol for projecting an image of a three-dimensional scene onto a two-dimensional planar surface such as a display screen or a piece of paper. The image resulting from such a projection, which is referred to as a "perspective view", can be understood as representing the appearance of the scene from a viewpoint located at a given distance and angle from the scene. Because a perspective view will vary depending on the location of the viewpoint used to generate the image, the term "perspective" is also used to refer to the viewpoint that forms the basis of a particular perspective view. Thus, as used herein, the term "perspective" refers not only to the projection protocol in general (for example, an image, scene, or object can be "rendered in perspective"), but also to a specific viewpoint used to generate an image of a given three-dimensional scene (for example, an image can be "rendered from a given perspective").

As used herein, the term "data structure" generally refers to a way of storing and organizing data in a computer accessible memory so that data can be used by an application or software module. A data structure in its simplest form can be, for example, a set of one or more memory locations. In some cases, a data structure may be implemented as a so-called record, sometimes referred to as a struct or tuple, and may have any number of fields or elements or storage locations. As will be further appreciated, the data structure may include data of interest and/or one or more pointers that refer to other memory locations where data of interest can be found. A data structure may include any format such as, for example, a look-up table or index format, an array format, a hash table format, a graph or tree or hierarchal format having a number of nodes, an object format that includes data fields, for instance similar to a record, as well as executable code for accessing and modifying those fields, and combinations of such formats. In a more general sense, the data structure may be implemented as a data set that can store specific values, without being constrained to any particular order or format. In accordance with one example embodiment, a data structure includes an object index, one or more reference plane definitions, and a plurality of reverse-projected object definitions. An object index includes, for instance, a listing of drawing objects that form a vector drawing that is to be manipulated and an indication of the reference plane with which a particular drawing object is associated. Reference plane definitions include, for instance, parameters that define the one or more reference planes onto which drawing objects can be projected. A reference plane can be defined, for instance, as a record including a certain depth from the viewer, a certain height from a ground baseline, a particular vanishing direction, or any suitable combination thereof. Reverse-projected object definitions include, for example, reverse-projections of the drawing objects referred to in object index as projected from their corresponding reference planes (as defined in reference plane definitions) onto a flat two-dimensional plane. Numerous acceptable data structure formats will be apparent in light of this disclosure.

System Architecture

FIG. 1 is a block diagram schematically illustrating selected components of a computer system 100 that can be used to update the appearance of a two-dimensional vector drawing based on changes to a perspective that is used to view the drawing. Computer system 100 may comprise, for example, one or more devices selected from a desktop computer, a laptop computer, a workstation, a tablet, a smartphone, a set-top box, a server, or any other such computing device. A combination of different devices may be used in certain embodiments. In the illustrated example embodiment, computer system 100 includes, among other things, a processor 110, an operating system 120, a communications module 140, an application user interface 150, and a memory 160. A bus 170 is also provided to allow for intra-device communications using, for example, communications module 140.

Computer system 100 is optionally coupled to a network 300 to allow for communications with other computing devices and resources, such as a dedicated graphics rendering sever or a cloud-based storage repository. Other componentry and functionality not reflected in the schematic block diagram of FIG. 1 will be readily apparent in light of this disclosure, and it will be appreciated that the claimed invention is not intended to be limited to any particular hardware configuration unless specifically recited. Thus other configurations and subcomponents can be used in other embodiments.

Processor 110 can be any suitable processor, and may include one or more coprocessors or controllers, such as a graphics processing unit or an audio processor, to assist in control and processing operations associated with computer system 100. Operating system 120 may comprise any suitable operating system, such as Google Android (Google, Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with computer system 100, and therefore may also be implemented using any suitable existing or subsequently-developed platform. Communications module 140 can be any appropriate network chip or chipset which allows for wired and wireless connection to network 300 and other computing devices and resources. Network 300 may be a local area network (such as a home-based or office network), a wide area network (such as the Internet), or a combination of such networks, whether public, private or both. In some cases access to resources on a given network or computing system may require credentials such as usernames, passwords, or any other suitable security mechanism.

Application user interface 150 is configured to provide a user interface 200 that is capable of providing information to, and receiving information from, a user of computer system 100. The provided user interface 200 can be implemented with or otherwise used in conjunction with one or more suitable peripheral hardware components 500 that are coupled to or that otherwise form a part of computer system 100. Examples of such components include a display 510, a textual input device 520 (such as a keyboard), and a pointer-based input device 530 (such as a mouse). One or more other input/output devices, such as a touchscreen display, a speaker, or a microphone, can be used in alternative embodiments. Application user interface 150 can be installed local to computer system 100, as shown in the example embodiment of FIG. 1. However, in other embodiments computer system 100 can be implemented in a client-server arrangement wherein at least some portions of application user interface 150 are provided to computer system 100 using an applet (for example, a JavaScript applet) or other downloadable module. Such a remotely-provisioned module can be provided in real-time in response to a request from computer system 100 for access to a server having resources that are of interest to the user of computer system 100. Examples of such resources include a cloud-based repository of images or other content that the user wishes to manipulate. The server, if applicable, may be local to network 300 or may be remotely coupled to network 300 by one or more other networks or communication channels. In any such stand-alone or networked computing scenarios, application user interface 150 can be implemented with any suitable technologies that allow a user to interact with computer system 100.

In certain embodiments application user interface 150 includes a perspective modification module 155 that is configured to provide computationally efficient techniques for updating the appearance of a two-dimensional vector drawing based on changes to a perspective that is used to view the drawing. Such techniques can be used with a variety of software applications such as image editing software applications, desktop publishing applications, word processing applications, presentation applications, digital video processing applications, and electronic mail applications. To this end, application user interface 150 may be included in, or used in conjunction with, any of such software applications. Likewise, in other embodiments perspective modification module 155 itself may be integrated into the given application rather than the entire application user interface 150 itself being so integrated. In still other embodiments perspective modification module 155 may be implemented as a distinct executable application that works in conjunction with application user interface 150 or another target application. As illustrated in FIG. 1, the functionality of perspective modification module 155 can be implemented using, for example, sub-modules such as a reference plane definition sub-module 155a, a reverse projection sub-module 155b, and a forward projection sub-module 155c. Other sub-modules may additionally or alternatively be included in other embodiments. For example, in other embodiments the projection techniques disclosed herein may be implemented in one or more dedicated modules with which application user interface 150 interacts. These various reference plane definition and reverse/forward projection techniques and sub-modules will be discussed in turn.

Still referring to FIG. 1, memory 160 can be implemented using any suitable type of digital storage, such as one or more of a disk drive, a universal serial bus (USB) drive, flash memory, random access memory, or any suitable combination of the foregoing. Memory 160 can be used to store a perspective transformation data structure 165 which may, in turn, include an object index 165a, one or more reference plane definitions 165b, and a plurality of reverse-projected object definitions 165c. Object index 165a comprises a listing of drawing objects that form a vector drawing that is to be manipulated. In certain embodiments each drawing object is associated with a particular reference plane, and therefore object index 165a may also include an indication of the reference plane with which a particular drawing object is associated. Thus in certain embodiments object index 165a provides not only (a) a link between a drawing object and its associated reference plane, but also (b) an index upon which subsequent processing iterations can be based to ensure that all appropriate drawing objects are transformed as desired by the user. Reference plane definitions 165b comprise parameters that define the one or more reference planes onto which the aforementioned drawing objects are projected. A reference plane can be defined in terms such as a certain depth from the viewer, a certain height from a ground baseline, a particular vanishing direction, or any suitable combination of the foregoing. Reverse-projected object definitions 165c comprise reverse-projections of the drawing objects (as indexed in object index 165a) as projected from their corresponding reference planes (as defined in reference plane definitions 165b) onto a flat two-dimensional plane. The application of perspective transformation data structure 165 in a perspective view manipulation operation will be described in turn.

The embodiments disclosed herein can be implemented in various forms of hardware, software, firmware, or special purpose processors. For example, in one embodiment a non-transitory computer readable medium has instructions encoded thereon that, when executed by one or more processors, cause one or more of the vector drawing modification methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented using JavaScript or another suitable browser-based technology.

The functionalities disclosed herein can optionally be incorporated into a variety of different software applications, such as image editing software applications, word processing applications, desktop publishing applications, and presentation applications. For example, a word processing application can be configured to manipulate digital images that are to be incorporated into a word processing document. The word processing application can therefore be configured to implement certain of the functionalities disclosed herein to facilitate such image manipulation. The computer software applications disclosed herein may include a number of different modules, sub-modules, or other components of distinct functionality, and can provide information to, or receive information from, still other components and services. These modules can be used, for example, to communicate with peripheral hardware components 500, networked storage resources, or other external components. Other components and functionality not reflected in the illustrations will be apparent in light of this disclosure, and it will be appreciated that the present disclosure is not intended to be limited to any particular hardware or software configuration. Thus in other embodiments the components illustrated in FIG. 1 may comprise additional, fewer, or alternative subcomponents.

The aforementioned non-transitory computer readable medium may be any suitable medium for storing digital information, such as a hard drive, a server, a flash memory, or random access memory. In alternative embodiments, the computer and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that the present disclosure is not intended to be limited to any particular system architecture.

Methodology and User Interface

FIG. 2 is a flowchart illustrating an example image manipulation method 1000 for updating the appearance of a two-dimensional vector drawing based on changes to a perspective that is used to view the drawing in accordance with certain of the embodiments disclosed herein. As can be seen, image manipulation method 1000 includes a number of phases and sub-processes, the sequence of which may vary from one embodiment to another. However, when considered in the aggregate, these phases and sub-processes form a complete image manipulation process that is responsive to user commands in accordance with certain of the embodiments disclosed herein. These methodologies can be implemented, for example, using the system architecture illustrated in FIG. 1. However other system architectures can be used in other embodiments, as will be apparent in light of this disclosure. To this end, the correlation of the various functionalities shown in FIG. 2 to the specific components illustrated in FIG. 1 is not intended to imply any structural or use limitations. Rather, other embodiments may include varying degrees of integration where multiple functionalities are performed by one system or by separate systems. For instance, in an alternative embodiment a single sub-module of perspective modification module 155 can be used to perform the reverse and forward projections of the drawing objects. Thus other embodiments may have fewer or more modules and sub-modules depending on the granularity of implementation. Numerous variations and alternative configurations will be apparent in light of this disclosure.

Still referring to FIG. 2, the example image manipulation method 1000 commences with application user interface 150 receiving a user command to modify a perspective of a rendered scene. See reference numeral 1100 in FIG. 2. In certain embodiments this user command is received based on a user interaction with a user interface element dedicated to perspective modification, such as selection of a specific button or menu item associated with perspective modification functionality. In other embodiments this user command can be derived or implied based on a related user action, such as manipulation of a vanishing point, a vanishing point guideline, or a horizon guideline. For example, FIG. 3A illustrates an initial two-dimensional perspective view 2000 of a three-dimensional scene. Two-dimensional perspective view 2000 comprises a plurality of drawing objects and includes a horizon guideline 2200. Two-dimensional perspective view 2000 also includes a first vanishing point 2110 that is associated with one or more first vanishing point guidelines 2112, as well as a second vanishing point 2120 that is associated with one or more second vanishing point guidelines 2122. Adjusting the location of first vanishing point 2110, second vanishing point 2120, or horizon guideline 2200 will cause the initial two-dimensional perspective 2000 to change, thereby changing the overall appearance of the rendered scene. Thus, in certain embodiments moving such elements, such as by performing a drag-and-drop operation, will be interpreted as a user command to modify the perspective of the rendered scene.

Figure 3B:
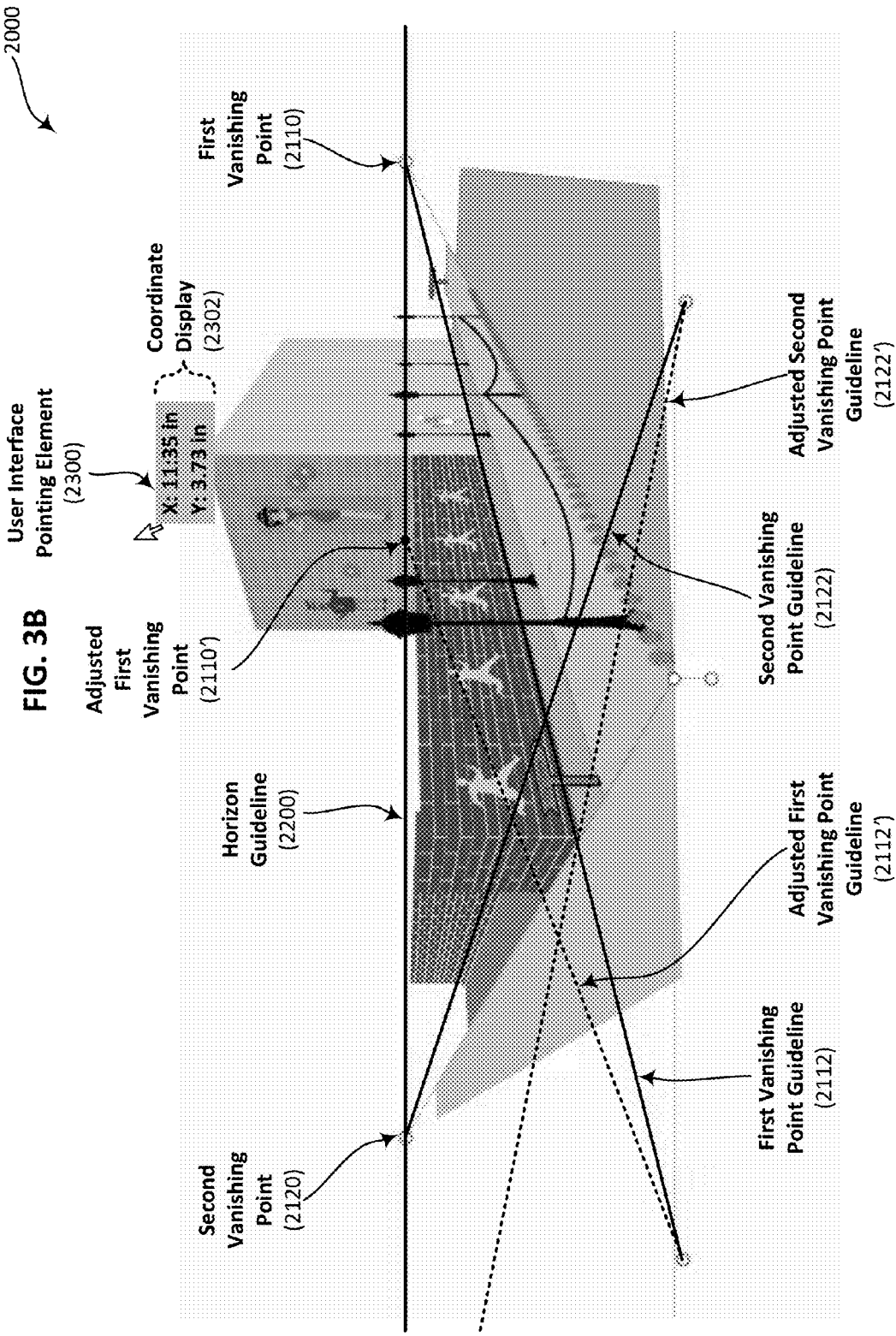
FIG. 3B illustrates an annotation of the perspective view of FIG. 3A as a user adjusts the location of a first vanishing point in accordance with certain of the embodiments disclosed herein.

For example, referring again to the two-dimensional perspective 2000 illustrated in FIG. 3A, it may be the case that a user wishes to modify this perspective view by changing the location of first vanishing point 2110. The user can perform a drag-and-drop operation to move first vanishing point 2110 to an adjusted first vanishing point 2110', as illustrated in FIG. 3B. Because first vanishing point 2110 will always be positioned somewhere along horizon guideline 2200—that is, because the y-coordinate of first vanishing point is fixed in this example—the y-coordinate of a user interface pointing element 2300 that is used to adjust the location of first vanishing point 2100 is not critical. The user therefore does not need to move pointing element 2300 along horizon guideline 2200, and only the x-coordinate of pointing element 2300 will be considered in establishing the location of adjusted first vanishing point 2110'. Pointing element 2300 optionally includes a coordinate display 2302 that indicates the x- and y-coordinates of adjusted first vanishing point 2110'. As the user adjusts the location of first vanishing point 2110—that is, before the "drop" portion of the drag-and-drop operation is performed—an adjusted first vanishing point guideline 2112' and an adjusted second vanishing point guideline 2122' are optionally displayed as well. These interim adjusted guidelines, which are also illustrated in FIG. 3B, may be represented by broken lines or some other characteristic that distinguishes them from the original guidelines. Because changing the location of first vanishing point 2110 will cause the location of second vanishing point 2120 to change as well, an adjusted second vanishing point can be illustrated as well, although it is not shown in FIG. 3B because it has moved off of the page.

Once a user command to modify an initial perspective of a rendered scene is recognized, reference plane definition sub-module 155a can be configured to extract reference plane information for each drawing object in the rendered scene. See reference numeral 1200 in FIG. 2. Each drawing object can be understood as containing a definition of a reference plane to which it belongs. Where the reference plane is defined as a flat surface located at a particular depth from an initial perspective viewpoint, the reference plane will appear to vanish in a left or right direction from such viewpoint. Where the reference plane is defined as a flat surface located at a certain height from a horizon guideline, the reference plane will appear to vanish in a top or bottom direction from the initial perspective viewpoint. Thus a given reference plane can be characterized by a depth or height parameter and a vanishing side parameter (left, right, top, or bottom). These parameters can be stored in a "PlaneInfo" field which forms part of perspective transformation data structure 165, and in particular, which constitutes reference plane definition 165b as illustrated in FIG. 1. Information characterizing a reference plane can be stored in reference plane definition 165b, which can be used late to project drawing objects into a modified perspective view. The particular parameters used to define a given reference plane (depth or height; and vanishing side) are not critical, and thus such parameters can be selected from a range of appropriate values, provided that such parameters remain fixed once selected.

The one or more reference planes can be defined after detecting a user command to modify initial two-dimensional perspective view 2000. For example, when the user command to modify the initial perspective is inferred as a result of the user initiating a drag-and-drop operation involving one of the vanishing points or the horizon guideline, the one or more reference planes can be defined as soon as the user begins the "drag" portion of the drag-and-drop operation. In an alternative embodiment, the one or more reference planes can be defined after the drag-and-drop operation is consummated. Thus it will be appreciated that the timing of when the one or more reference planes are defined is not critical, and may be performed at any suitable point after it is determined that the user wishes to modify initial two-dimensional perspective view 2000. Once the one or more reference planes are defined, reference plane definition sub-module 155a can be configured to store the corresponding one or more reference plane definitions 165b in perspective transformation data structure 165. See reference numeral 1250 in FIG. 2.

Once the user command to modify the initial perspective of a rendered scene is recognized, perspective modification module 155 can be configured to generate object index 165a. Object index 165a can be understood as comprising data that characterizes each drawing object having an appearance that will change as a result of modifying the initial perspective. For example, in one embodiment object index 165a includes all drawing objects included in the rendered scene. See reference numeral 1400 in FIG. 2. In other applications, where certain drawings objects (such as captions, borders, or annotations) will not change as a result of modifying the initial perspective, such fixed-appearance objects may be omitted from the generated object index 165a. Likewise, drawing objects which do not conform to the perspective view which is to be modified may not be indexed either. Each indexed drawing object can be characterized (a) by its depth from an initial viewpoint, and (b) by association with a corresponding one of the previously-defined reference planes. In addition, one or more other parameters can also be used to characterize the indexed drawing objects, such as shape, vector coordinates, color, and texture.

The generated object index 165a can be derived from existing information defining the rendered scene. In particular, because many file formats used to characterize perspective images already include an object index, this existing object index can form the basis for object index 165a which is generated as a result of performing image manipulation method 1000. For example, in one embodiment data from an existing object index can be extracted and supplemented by associating each indexed drawing object with one of the previously-defined reference planes. Leveraging existing object index data advantageously avoids generating a new object index from scratch, and thereby increases system responsiveness and reduces processing times. However, regardless of whether or not object index 165a is generated based on existing object data, perspective modification module 155 can optionally be configured to store the generated object index 165a in perspective transformation data structure 165. See reference numeral 1450 in FIG. 2. In some cases an existing object index is supplemented with data identifying or characterizing the corresponding reference plane for each drawing object, thereby making subsequent object indexing operations more efficient.

Object index 165a can be generated after detecting a user command to modify initial two-dimensional perspective view 2000. For example, in one embodiment object index 165a is generated after the one or more reference planes are defined, regardless of the fact that at such point the user may not have completed a drag-and-drop operation to define a modified perspective. That is, in certain embodiments both reference plane definitions 165b and object index 165a can be generated and stored in perspective transformation data structure 165 despite the fact that the modified perspective remains undefined. Thus it will be appreciated that the timing of when object index 165a is generated is not critical, and may be performed at any suitable point after it is determined that the user wishes to modify initial two-dimensional perspective view 2000.

Once a reference plane has been defined and object index 165a has been generated, reverse projection sub-module 155b can be configured to reverse-project each of the indexed drawing objects onto its corresponding reference plane. See reference numeral 1500 in FIG. 2. Because object index 165a includes information characterizing both the drawing objects and the corresponding reference plane for each drawing object, object index 165a can be passed directly to reverse projection sub-module 155b. In particular, in certain embodiments reverse projection sub-module 155b can reverse project the drawing objects based entirely on the data extracted from object index 165a, thereby eliminating any need to query other data structures. Given an object definition in an initial perspective and a reference plane definition, the object can be reverse-projected into the reference plane according to any suitable projection algorithm. For example, in one embodiment a visual ray tracing or measure point technique can be used to perform the reverse projection, although other projection algorithms can be used in other embodiments. Once the reverse projection is performed, each drawing object can be characterized as a flat, two-dimensional object rendered in its corresponding reference plane. The resulting plurality of reverse-projected object definitions 165c can be stored in perspective transformation data structure 165. See reference numeral 1550 in FIG. 2. Perspective transformation data structure 165 will therefore be understood as including not only reverse-projected object definitions 165*c* for each indexed object, but also depth information characterizing the depth at which each indexed object is positioned with respect to the initial viewpoint.

As described herein, reference plane definitions 165*b* and object index 165*a* can both be generated before or after the user fully defines a modified perspective. Regardless, at some point application user interface 150 can be assumed to receive user input that defines the modified perspective. See reference numeral 1600 in FIG. 2. For example, this user input may come in the form of a consummated drag-and-drop operation, such as when the user "drops" a vanishing point or a horizon guideline at a new position. In some cases, the user may be prompted to accept a modified viewpoint via a confirmation dialog box. Once the modified perspective is fully defined, forward projection sub-module 155*c* can be used to project each indexed drawing object from its corresponding reference plane into the modified perspective. See reference numeral 1700 in FIG. 2. In particular, given an object definition in a reference plane and a modified perspective definition, the object can be forward-projected into the modified perspective according to any suitable projection algorithm. For example, in one embodiment a visual ray tracing or measure point technique can be used to perform the forward projection, although other projection algorithms can be used in other embodiments.

Figure 3C:
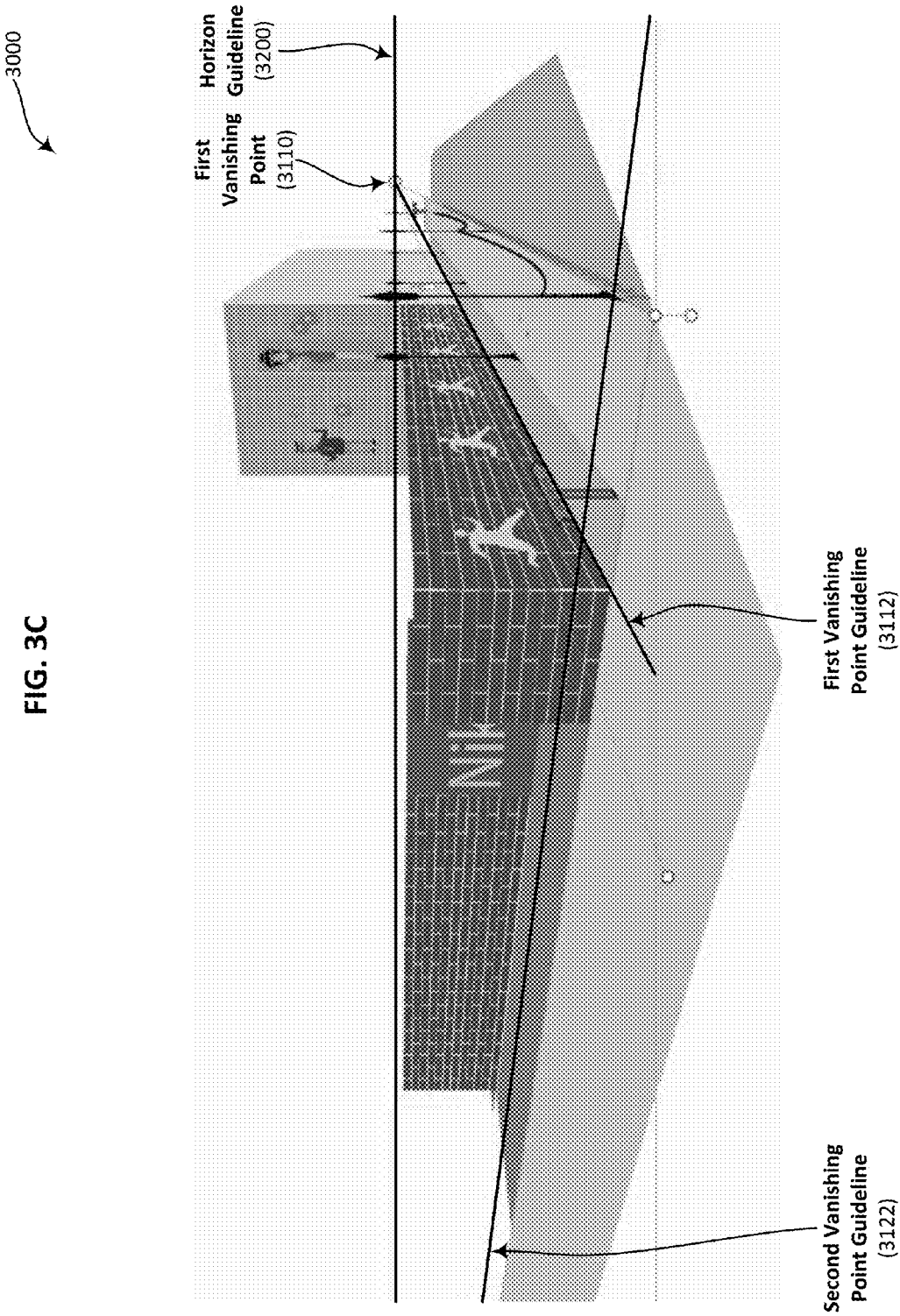
FIG. 3C is a two-dimensional perspective view of the three-dimensional scene of FIG. 3A rendered in accordance with a modified perspective, based on the adjusted location of the first vanishing point of FIG. 3B.

Once each indexed drawing object is forward-projected from the reference plane into the modified perspective, perspective modification module 155 can be configured to render each drawing object according to the modified perspective. See reference numeral 1800 in FIG. 2. The depth information stored in object index 165*a* can be used to ensure that each rendered object is projected at the correct depth in the modified perspective, which will result in certain objects being revealed or hidden (overlapped) as appropriate. For example, FIG. 3C illustrates the result of moving first vanishing point 2110 (as illustrated in FIG. 3A) to the location of adjusted vanishing point 2110' (as illustrated in FIG. 3B). In particular, FIG. 3C illustrates a modified two-dimensional perspective view 3000 which comprises the same plurality of drawing objects as illustrated in FIG. 3A after such drawing objects have been reverse-projected to a reference plane and forward-projected from the reference plane to the modified perspective. Certain objects which appear in FIG. 3A but which do not appear in FIG. 3C may be obscured by other drawing objects positioned at a different relative depth. Modified two-dimensional perspective view 3000 includes a horizon guideline 3200 which is identical to horizon guideline 2200 of FIG. 3A since the position of such horizon guideline was not adjusted. Modified two-dimensional perspective view 3000 also includes a first vanishing point 3110 that is associated with one or more first vanishing point guidelines 3112. Modified two-dimensional perspective 3000 also includes one or more second vanishing point guidelines 3122, although corresponding second vanishing point is not illustrated because it has moved off the page. These vanishing points and vanishing point guidelines have been modified as compared to those illustrated in FIG. 3A.

From a user's perspective, the process of adapting the rendered scene based on the modified perspective seamlessly flows from the user inputs that define the modified perspective. Specifically, object index 165*a* and reference plane definitions 165*b* can both be generated transparently simply as the result of the user initiating a drag-and-drop operation with respect to a vanishing point or a horizon guideline. Likewise, reverse-projecting the indexed drawing objects to one or more corresponding reference planes can also be performed in response to such user operations. Once the user sets the modified perspective, such as by consummating the drag-and-drop operation, the indexed drawing objects can be forward-projected from the one or more reference planes and rendered in the modified perspective. The user advantageously is not bothered with taking actions with respect to individual drawing objects, and therefore the techniques disclosed herein can be used to uniformly render a scene comprising tens, hundreds, thousands, or more objects in a modified perspective. The object processing techniques disclosed herein can be applied to two-dimensional images that are rendered so as to create the appearance of a three-dimensional scene. This advantageously allows a user to dynamically modify the appearance of a three-dimensional scene without actually invoking three-dimensional object modeling techniques.

Certain embodiments of image manipulation method 1000 can be understood as invoking three iterations. First, generating object index 165*a* can be understood as a process of iterating through each of the drawing objects which are to be rendered in the modified perspective. See reference numeral 1400 in FIG. 2. Second, generating reverse-projected object definitions 165*c* can be understood as an iterative process of reverse projecting each of the indexed drawing objects into a corresponding reference plane. See reference numeral 1500 in FIG. 2. Third, rendering the drawing objects according to the modified perspective can be understood as an iterative process of forward-projecting each of the indexed drawing objects from a reference plane to the modified perspective. See reference numeral 1700 in FIG. 2. It will be appreciated that, in general, data characterizing drawing objects rendered in perspective can be extracted from an image file, processed according to the techniques disclosed herein, and saved again. Thus a modified perspective view defined with respect to a first image can be applied to multiple other images. In such applications, the modified perspective view can be stored in an image file and defined based on scene parameters such as number of vanishing points, viewing distance, horizon height, and viewing angle. More generally, the techniques disclosed herein do not require that the drawing objects be rendered before or after being modified to conform to a new perspective view.

Figure 3D:
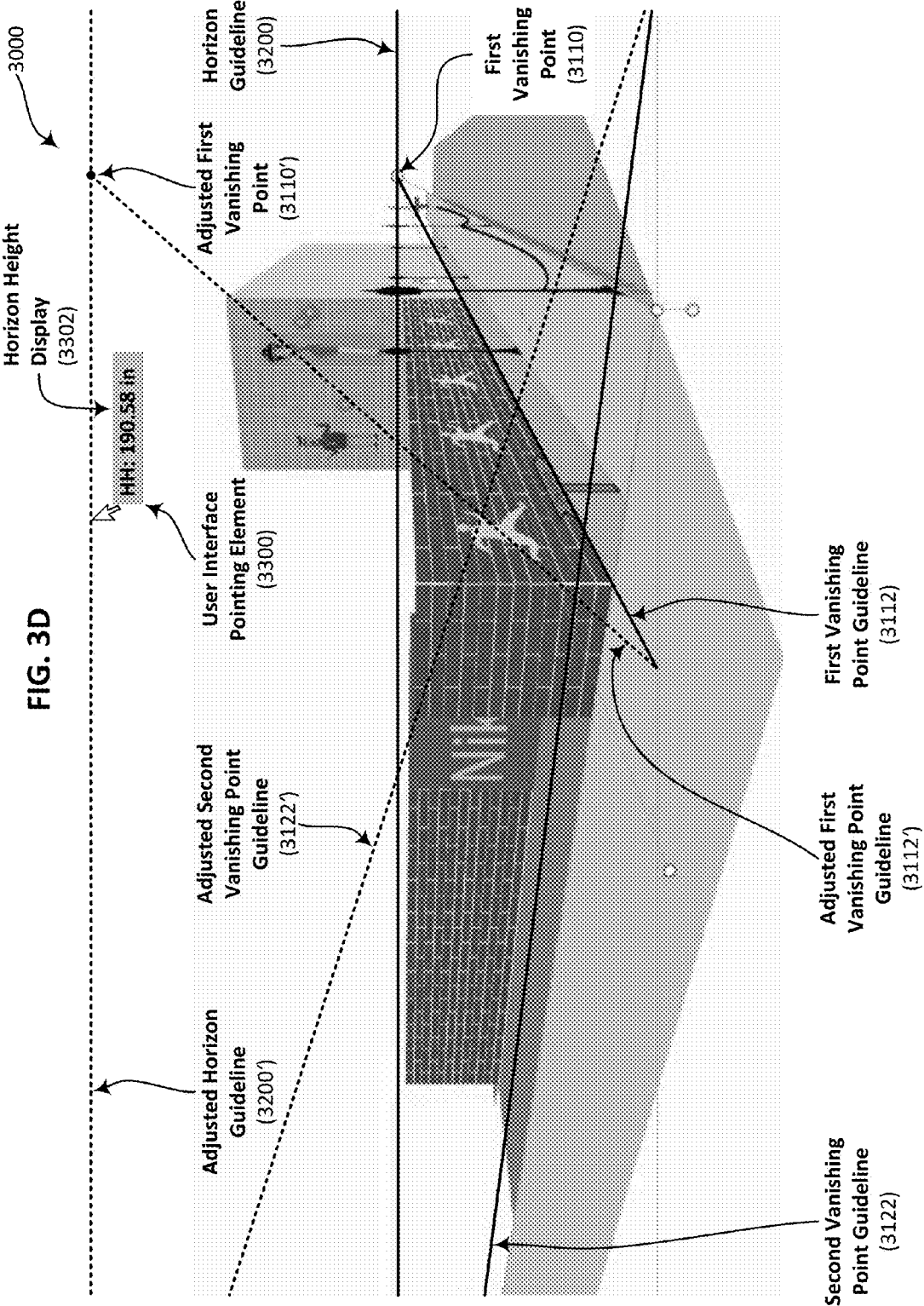
FIG. 3D illustrates an annotation of the perspective view of FIG. 3C as a user adjusts the location of a horizon guideline in accordance with certain of the embodiments disclosed herein.

Certain embodiments have been described and illustrated in the context of a user modifying the perspective of a rendered scene by adjusting the location of a vanishing point. However, in alternative embodiments a user may modify the perspective in other ways, such as by changing the location of a horizon guideline associated with the perspective. For example, referring again to the two-dimensional perspective 3000 illustrated in FIG. 3C, the user can perform a drag-and-drop operation to move horizon guideline 3200 to a modified location of an adjusted horizon guideline 3200', as illustrated in FIG. 3D. As the user adjusts the location of horizon guideline 3200—that is, before the "drop" portion of the drag-and-drop operation is performed—an adjusted first vanishing point guideline 3112' and an adjusted second vanishing point guideline 3122' are optionally displayed as well. These interim adjusted guidelines, which are also illustrated in FIG. 3D, may be represented by broken lines or some other characteristic that distinguishes them from the original guidelines. Additionally, because first vanishing point 3100 will likewise change its location such that it remains positioned along adjusted horizon guideline 3200', FIG. 3D also illustrates an adjusted first vanishing point 3110'. The user can manipulate the drag-and-drop operation using a user interface pointing element 3300 that optionally includes a horizon height display 3302 that indicates a horizon height ("HH") associated with adjusted horizon guideline 3200'.

Figure 3E:
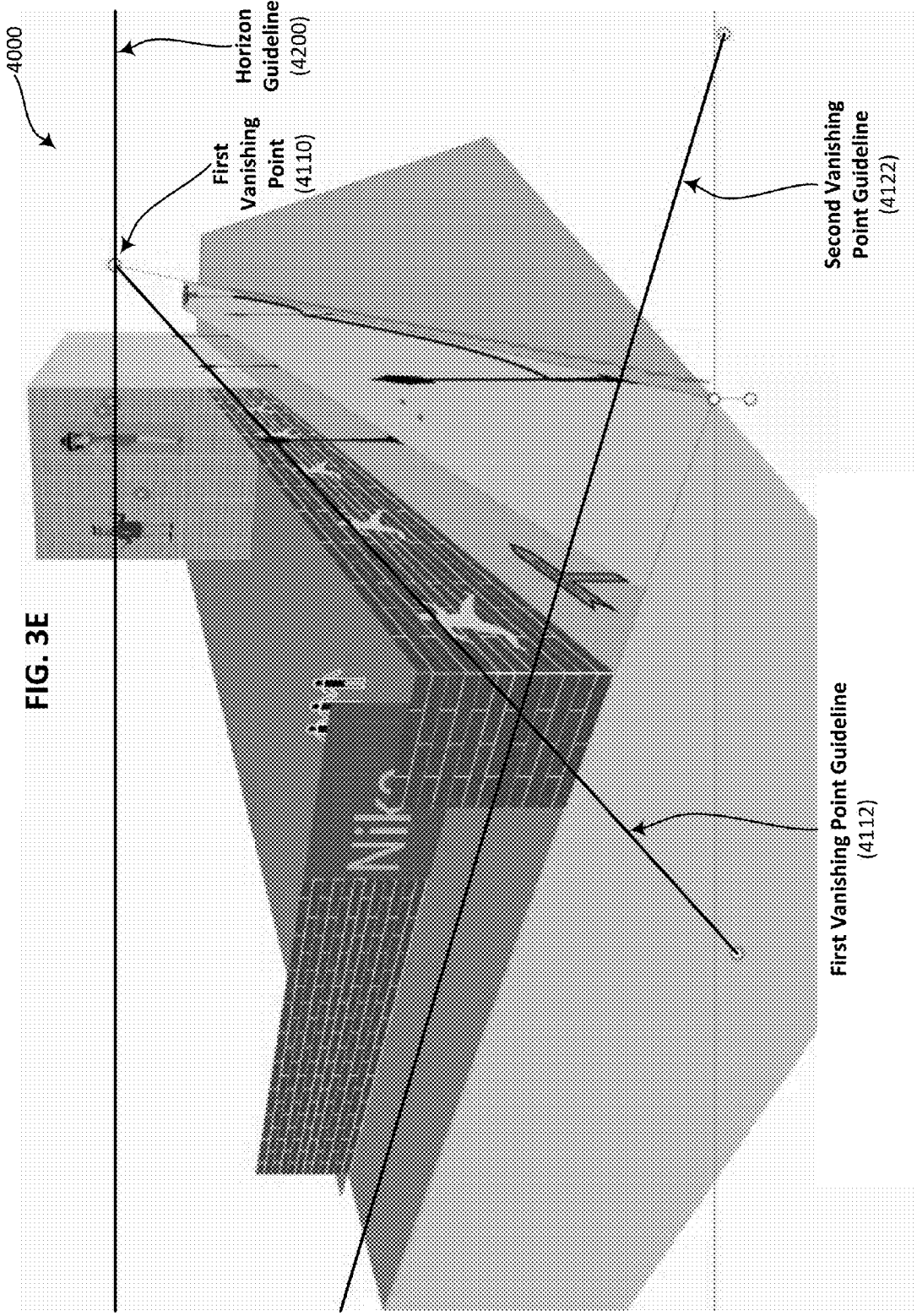
FIG. 3E is a two-dimensional perspective view of the three-dimensional scene of FIG. 3C rendered in accordance with a further modified perspective, based on the adjusted location of the horizon guideline of FIG. 3D.

As described herein, while the user is adjusting the location of horizon guideline 3200, the drawing objects comprising two-dimensional perspective 3000 can be indexed and reverse-projected to a reference plane. Once the user sets the modified perspective, such as by "dropping" the position of adjusted horizon guideline 3200', forward projection submodule 155c can be used to project each indexed drawing object from its corresponding reference plane into the modified perspective. Perspective modification module 155 can then render each drawing object according to the modified perspective. For example, FIG. 3E illustrates the result of moving horizon guideline 3200 (as illustrated in FIG. 3C) to the location of adjusted horizon guideline 3200' (as illustrated in FIG. 3D). In particular, FIG. 3E illustrates a modified two-dimensional perspective view 4000 which comprises the same plurality of drawing objects as illustrated in FIG. 3C after such drawing objects have been reverse-projected to a reference plane and forward projected from the reference plane to the modified perspective. Certain objects which appear in FIG. 3C but which do not appear in FIG. 3E may be obscured by other drawing objects positioned at a different relative depth. Modified two-dimensional perspective view 4000 includes a horizon guideline 4200 and a first vanishing point 4110. Modified two-dimensional perspective 4000 also includes one or more first vanishing point guidelines 4112 and one or more second vanishing point guidelines 4122, although the second vanishing point itself is not illustrated because it is positioned off the page. These vanishing points and vanishing point guidelines have been modified as compared to those illustrated in FIG. 3C.

CONCLUSION

Numerous variations and configurations will be apparent in light of this disclosure. For instance, one example embodiment provides a method for modifying an appearance of a rendered scene, the method comprising receiving a command to modify an initial perspective at which a rendered scene is viewed. The rendered scene comprises a drawing object. The method further comprises, in response to the command, associating the drawing object with a reference plane that is characterized by a depth parameter in the initial perspective. The method further comprises reverse projecting the drawing object from the initial perspective to the reference plane. The method further comprises receiving a definition of a modified perspective. The method further comprises forward projecting the drawing object from the reference plane to the modified perspective to produce a forward-projected drawing object. The method further comprises rendering the forward-projected drawing object at a particular depth in the modified perspective. The particular depth is at least partially based on the depth parameter of the reference plane. In some cases the definition of the modified perspective is received in response to consummation of a drag-and-drop operation with respect to a user interface control element selected from a group consisting of a vanishing point and a horizon guideline. In some cases rendering the forward-projected drawing object comprises displaying the forward-projected drawing object on a display screen. In some cases the method further comprises storing a definition corresponding to the reference plane in a perspective transformation data structure. In some cases the drawing object is associated with the reference plane and is reverse projected before receiving the definition of the modified perspective. In some cases the drawing object is associated with the reference plane and is reverse projected after receiving the definition of the modified perspective. In some cases (a) \the rendered scene comprises a plurality of drawing objects; and (b) each of the plurality of drawing objects are associated with one of a plurality of reference planes. In some cases the command comprises selecting a user interface control element selected from a group consisting of a vanishing point and a horizon guideline.

Another example embodiment of the present invention provides a system for modifying an appearance of a rendered scene, the system comprising an application user interface. The application user interface is configured to receive a command to modify an initial perspective at which a rendered scene is viewed, the rendered scene comprising a plurality of drawing objects. The application user interface is also configured to receive a definition of a modified perspective at which the plurality of drawing objects are to be rendered. The system further comprises a reference plane definition module configured to define one or more reference planes and to associate each of the plurality of drawing objects with one of the reference planes. Each of the reference planes is characterized by a depth parameter in the initial perspective. The system further comprises a projection module configured to reverse and forward project a selected drawing object (a) from the initial perspective to an associated reference plane, and (b) from the associated reference plane to the modified perspective, respectively. The system further comprises a memory configured to store (a) an index of the plurality of drawing objects, and (b) one or more reference plane definitions corresponding to the one or more reference planes. The system further comprises a rendering device configured to render a forward-projected drawing object at a particular depth in the modified perspective. The particular depth is at least partially based on the depth parameter of a reference plane associated with the forward-projected drawing object.

Another example embodiment of the present invention provides a computer program product encoded with instructions that, when executed by one or more processors, causes a process for modifying an appearance of a rendered scene to be carried out. The process comprises receiving a command to modify an initial perspective at which a rendered scene is viewed. The rendered scene comprises a plurality of drawing objects. The process further comprises, in response to receiving the command, associating each of the drawing objects with a reference plane that is characterized by a depth parameter in the initial perspective. The process further comprises reverse projecting each of the drawing objects from the initial perspective to its associated reference plane. The process further comprises receiving a definition of a modified perspective. The process further comprises forward projecting each of the drawing objects from its associated reference plane to the modified perspective, thereby producing a plurality of forward-projected drawing objects. The process further comprises rendering each of the plurality of forward-projected drawing objects at a particular depth in the modified perspective. The particular depth is at least partially based on the depth parameter of an associated reference plane. In some cases each of the drawing objects is reverse projected to its associated reference plane before the definition of the modified perspective is received. In some cases the plurality of drawing objects are associated with a single common reference plane. In some cases the process further comprises compiling an object index that includes an index of the plurality of drawing objects and that provides a correlation between each of the drawing objects and its associated reference plane. In some cases the command comprises a selection of a user interface element selected from a group consisting of a vanishing point and a horizon guideline. In some cases the process further comprises storing a reference plane definition in a perspective transformation data structure. In some cases the reference plane definition includes the depth parameter and a vanishing direction.

The foregoing detailed description has been presented for illustration. It is not intended to be exhaustive or to limit the disclosure to the precise formed described. Many modifications and variations are possible in light of this disclosure. Therefore it is intended that the scope of the disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for modifying an appearance of a rendered scene, the method comprising:
    displaying a rendered scene having an initial perspective, the rendered scene comprising a drawing object;
    in response to receiving a command to modify the initial perspective of the rendered scene, associating the drawing object with a reference plane that is characterized by a depth parameter in the initial perspective;
    transforming the drawing object from the initial perspective to the reference plane;
    receiving a definition of a modified perspective;
    transforming the drawing object from the reference plane to the modified perspective to produce a forward-projected drawing object; and
    rendering the forward-projected drawing object at a particular depth in the modified perspective, wherein the particular depth is at least partially based on the depth parameter of the reference plane.

2. The method of claim 1, wherein the definition of the modified perspective is received in response to consummation of a drag-and-drop operation with respect to a user interface control element selected from a group consisting of a vanishing point and a horizon guideline.

3. The method of claim 1, wherein rendering the forward-projected drawing object comprises displaying the forward-projected drawing object on a display screen.

4. The method of claim 1, further comprising storing a definition of the reference plane in a perspective transformation data structure.

5. The method of claim 1, wherein the drawing object is associated with the reference plane and is transformed to the reference plane before receiving the definition of the modified perspective.

6. The method of claim 1, wherein the drawing object is associated with the reference plane and is transformed to the reference plane after receiving the definition of the modified perspective.

7. The method of claim 1, wherein:
    the rendered scene comprises a plurality of drawing objects; and
    each of the plurality of drawing objects is associated with one of a plurality of reference planes.

8. The method of claim 1, wherein the command comprises selecting a user interface control element selected from a group consisting of a vanishing point and a horizon guideline.

9. A perspective transformation system that includes a memory device and a processor that is operatively coupled to the memory device, wherein the processor is configured to execute instructions stored in the memory device that, when executed, cause the processor to carry out a perspective transformation process, the process comprising:
    receiving (a) a command to modify an initial perspective at which a rendered scene is viewed, the rendered scene comprising a plurality of drawing objects, and (b) a definition of a modified perspective at which the plurality of drawing objects are to be rendered;
    defining one or more reference planes;
    associating each of the plurality of drawing objects with one of the reference planes, wherein each of the reference planes is characterized by a depth parameter in the initial perspective;
    transforming a selected drawing object (a) from the initial perspective to an associated reference plane, and (b) from the associated reference plane to the modified perspective;
    storing, in the memory device, (a) an index of the plurality of drawing objects, and (b) one or more reference plane definitions corresponding to the one or more reference planes; and
    rendering a transformed drawing object at a particular depth in the modified perspective, wherein the particular depth is at least partially based on the depth parameter of a reference plane associated with the transformed drawing object.

10. The system of claim 9, wherein the command comprises a selection component of a drag-and-drop operation, and the definition of the modified perspective is defined by a drop component of the drag-and-drop operation.

11. The system of claim 9, wherein the one or more reference planes are defined before the definition of the modified perspective is received.

12. The system of claim 9, wherein the selected drawing object is transformed from the initial perspective to the associated reference plane before the definition of the modified perspective is received.

13. The system of claim 9, wherein the memory device is further configured to store an object definition corresponding to the transformed drawing object.

14. A computer program product encoded with instructions that, when executed by one or more processors, causes a process for modifying an appearance of a rendered scene to be carried out, the process comprising:
    displaying a rendered scene having an initial perspective, wherein the rendered scene comprises a plurality of drawing objects;
    in response to a selection component of a drag-and-drop command, associating each of the drawing objects with one of a plurality of reference planes, wherein each reference plane is characterized by a depth parameter in the initial perspective;
    transforming each of the drawing objects from the initial perspective to its associated reference plane;
    in response to a drop component of the drag-and-drop command, defining a modified perspective;
    transforming each of the drawing objects from its associated reference plane to the modified perspective; and
    rendering each of the drawing objects at a particular depth in the modified perspective, wherein the particular depth of a particular drawing object is at least partially based on the depth parameter of the reference plane associated with the particular drawing object.

15. The computer program product of claim 14, wherein:
    each of the depth parameters characterizes a distance between its corresponding reference plane and a viewpoint defining the initial perspective; and
    rendering a first drawing object at a first depth in the modified perspective causes the first drawing object to at least partially obscure a second drawing object that is also rendered in the modified perspective.

16. The computer program product of claim 14, wherein each of the drawing objects is transformed to its associated reference plane before the modified perspective is defined.

17. The computer program product of claim 14, wherein the process further comprises compiling an object index that includes an index of the plurality of drawing objects and that provides a correlation between each of the drawing objects and its associated reference plane.

18. The computer program product of claim 14, wherein the selection component of the drag-and-drop command comprises a selection of a user interface element selected from a group consisting of a vanishing point and a horizon guideline.

19. The computer program product of claim 14, wherein:
the process further comprises storing a reference plane definition in a perspective transformation data structure; and
the reference plane definition includes a plurality of depth parameters and a corresponding plurality of vanishing directions.

\* \* \* \* \*